UNITED STATES PATENT OFFICE.

KARL KAUTZSCH, OF HÖCHST-ON-THE-MAIN, GERMANY, ASSIGNOR TO FARBWERKE VORM. MEISTER LUCIUS & BRÜNING, OF HÖCHST-ON-THE-MAIN, GERMANY, A CORPORATION OF GERMANY.

COMPOUND OF SILVER GLYCOCHOLATE READILY SOLUBLE IN WATER.

1,161,866.

Specification of Letters Patent. Patented Nov. 30, 1915.

No Drawing. Application filed January 29, 1915. Serial No. 5,119.

*To all whom it may concern:*

Be it known that I, KARL KAUTZSCH, Ph. D., chemist, a citizen of the Empire of Germany, residing at Höchst-on-the-Main, Germany, have invented certain new and useful Improvements in a new Compound of Silver Glycocholate Readily Soluble in Water, of which the following is a specification.

Hitherto the silver glycocholate, the components of which possess valuable therapeutical properties, could not be used in therapeutics owing to the fact that it is exceedingly difficultly soluble,—even in hot water,—that it readily decomposes, and readily turns into a gelatinous form. Now I have found it is possible to convert the silver glycocholate into a form in which it is readily soluble in water, namely by converting it into an ammonia compound thereof. This conversion may be effected in various ways, for instance by causing ammonia to act upon silver glycocholate, or by subjecting ammonium glycocholate to the action of silver oxid, or glycocholic acid to the action of an ammoniacal solution of silver oxid. The process may also be carried out by causing silver salts to act upon glycocholates in presence of ammonia.

The product obtainable by any of the above indicated processes is a colorless powder having most probably the formula—

$$C_{23}H_{39}O_3.CO.NH.CH_2.COOAg(NH_3),$$

which melts in a capillary tube at about 195° C. while effervescing and assuming a dark color. It is readily soluble in water and in hot alcohol of 90 per cent. strength, more difficultly soluble in cold alcohol of 90 per cent. strength, insoluble in ether, benzene and toluene, from its aqueous solution, when treated with hydrochloric acid, ammonia is separated in the form of ammonium chlorid and at the same time a precipitate of silver chlorid mixed with difficultly—soluble glycocholic acid is formed.

The following examples illustrate my invention, the parts being by weight.

Example I: 100 parts of silver glycocholate are suspended in about 500 parts of hot alcohol and dissolved by adding a concentrated aqueous solution of ammonia in the heat. This solution after having been treated with animal charcoal is filtered and cooled. The ammonia-silver glycocholate thus produced separates as colorless, more or less compact crystals. In order to completely separate the compound some quantity of ether is added to the liquid. The new compound may be purified for instance by re-crystallizing it from hot spirit; when gradually cooled, it separates in heaps of colorless, partly star-shaped, aggregated needles. The product, dried in the air, decomposes when heated in a capillary tube at about 195° C., while effervescing and assuming a dark color; at a temperature slightly lower than 195°, it becomes already brownish. The product readily dissolves in water; it is also soluble in methyl alcohol, moderately soluble in hot alcohol and difficultly soluble in cold absolute alcohol; it is insoluble in ether, benzene and toluene.

Example II: 50 parts of silver glycocholate are dissolved in about 750 parts of a hot ammoniacal alcohol of 90 per cent. strength. The solution, if colored, is decolorized by an addition of a small quantity of animal charcoal. In order to separate the new compound the hot, colorless solution is cooled, or to obtain a better yield of the product, about 600 parts of ether are added to the solution, whereupon the ammonia-silver glycocholate separates in a very good yield as colorless, fine crystals. Finally it is filtered and washed with a mixture of alcohol and ether.

Example III: 50 parts of ammonium glycocholate are dissolved in about 4 times its weight of alcohol of 96 per cent. strength and there are then added by portions, while gently heating and stirring, so much of moist silver oxid as corresponds to about 12.1 parts of $Ag_2O$. The silver oxid is thus gradually dissolved. There are then added a few drops of ammonia and a small quantity of animal charcoal, and the whole is heated for a short time and filtered while hot. The colorless solutions thus obtained eliminates on cooling the ammonia silver glycocholate in a very good yield as white, star-shaped and fascicular crystalline needles. By adding a small quantity of ether the separation of the glycocholate compound is augmented.

Example IV: 50 parts of glycocholic acid are introduced into an ammoniacal solution of silver oxid of about 5% strength containing 11.6 parts of Ag. The solution thus obtained is concentrated in a vacuum at a low temperature; this concentrated solution is mixed with about an equal volume of alcohol and in order to decolorize it, treated on the water bath with a small quantity of animal charcoal. The filtered colorless solution separates on cooling the desired ammonia-silver glycocholate as white crystals which are filtered off. For further separating the product, the mother liquor may be treated with ether as indicated in Example III. The solution obtained from the reaction may also be carefully evaporated directly in a vacuum at a low temperature and the remaining product, in order to purify it, may be recrystallized from hot spirit preferably while adding some ammonia and decolorizing with a small quantity of animal charcoal.

Example V: To 100 parts of glycocholic acid, dissolved in 400 parts of hot spirit, are added 36 parts of silver acetate dissolved in about 80 parts of hot spirit with addition of an aqueous solution of ammonia. On cooling, the ammonia compound of silver glycocholate to be produced separates in an excellent yield as colorless crystals.

Example VI: To a concentrated aqueous ammoniacal solution of 20 parts of glycocholic acid are added 6.71 parts of silver sulfate. The solution thus obtained is mixed with a hot aqueous solution of barium hydrate containing 6.8 parts of barium hydrate and 8 aqua. The precipitated barium sulfate is filtered off and, if required, the ammonia-silver glycocholate is obtained from the colorless filtrate in a solid form by precipitation (for instance with acetone) or concentration in a vacuum at a low temperature etc.

If the treatment of the ammonium glycocholate with silver acetate is effected in diluted solution, the ammonia-silver glycocholate may be separated from the solution obtained from the reaction by means of any suitable precipitant, while ammonium acetate remains dissolved.

Example VII: To a solution of 50 parts of barium glycocholate in about 330 parts of hot spirit are added 14.65 parts of silver sulfate in a hot concentrated aqueous ammoniacal solution. The precipitated barium sulfate is filtered off in the heat. The silver salt to be obtained crystallizes from the filtrate, particularly on cooling, as colorless crystals. By adding a precipitant, for instance acetone, the yield may be increased.

When operating with a higher concentration and at a lower temperature respectively, the ammonia silver glycocholate separated together with the barium sulfate may be extracted by means of hot alcohol from which it separates on cooling.

Having now described my invention, what I claim is:

As a new article of manufacture, the argent-ammonium glycocholate, having most probably the formula—

$$C_{23}H_{39}O_3.CO.NH.CH_2.COOAg(NH_3),$$

being a colorless powder which melts in a capillary tube at about 195° C. while effervescing and assuming a dark color, being readily soluble in water and in hot alcohol of 90 per cent. strength, more difficultly soluble in cold alcohol of 90 per cent. strength, insoluble in ether, benzene and toluene, separating from its aqueous solution, when treated with hydrochloric acid, ammonia in the form of ammonium chlorid, and forming at the same time a precipitate of silver chlorid mixed with difficultly-soluble glycocholic acid.

In testimony whereof I affix my signature in presence of two witnesses.

KARL KAUTZSCH.

Witnesses:
 JEAN GRUND,
 CARL GRUND.